US007131060B1

(12) United States Patent
Azuma

(10) Patent No.: US 7,131,060 B1
(45) Date of Patent: Oct. 31, 2006

(54) SYSTEM AND METHOD FOR AUTOMATIC PLACEMENT OF LABELS FOR INTERACTIVE GRAPHICS APPLICATIONS

(75) Inventor: Ronald Azuma, Santa Monica, CA (US)

(73) Assignee: Raytheon Company, Waltham, MA (US)

( * ) Notice: Subject to any disclaimer, the term of this patent is extended or adjusted under 35 U.S.C. 154(b) by 866 days.

(21) Appl. No.: 09/677,467

(22) Filed: Sep. 29, 2000

(51) Int. Cl.
*G06N 3/00* (2006.01)

(52) U.S. Cl. ..................................... 715/512
(58) Field of Classification Search .............. 345/630, 345/440, 419, 650; 715/517, 809, 512, 630, 715/440, 419, 513, 523, 530, 518, 519, 790; 703/6, 15; 707/3
See application file for complete search history.

(56) References Cited

U.S. PATENT DOCUMENTS

| | | | | |
|---|---|---|---|---|
| 5,307,455 | A * | 4/1994 | Higgins et al. | 345/440 |
| 5,428,733 | A * | 6/1995 | Carr | 715/809 |
| 5,450,535 | A * | 9/1995 | North | 345/440 |
| 5,684,940 | A * | 11/1997 | Freeman et al. | 345/630 |
| 5,963,731 | A * | 10/1999 | Sagawa et al. | 703/6 |
| 6,081,764 | A * | 6/2000 | Varon | 701/120 |
| 6,091,424 | A | 7/2000 | Madden et al. | 345/433 |
| 6,154,219 | A * | 11/2000 | Wiley et al. | 345/587 |
| 6,154,220 | A * | 11/2000 | Prakriya et al. | 345/440 |
| 6,295,517 | B1 * | 9/2001 | Roy et al. | 703/15 |
| 6,507,838 | B1 * | 1/2003 | Syeda-Mahmood | 707/3 |
| 6,525,723 | B1 * | 2/2003 | Deering | 345/419 |
| 6,562,077 | B1 * | 5/2003 | Bobrow et al. | 715/517 |
| 6,748,447 | B1 * | 6/2004 | Basani et al. | 709/244 |
| 2004/0068758 | A1 | 4/2004 | Daily et al. | 725/136 |

FOREIGN PATENT DOCUMENTS

JP 2000047577 2/2000

OTHER PUBLICATIONS

Kelley et al., "A Book on C: Fourth Edition," Addison-Wesley Longman, Inc., pp. 372-376.*
Reynolds, Linda, "Colour for Air Traffic Control Displays", Butterworth-Heinemann Ltd. Displays, vol. 15, No. 4, 1994.
International Search Report of International Application No. PCT/US01/23243.
Strijk, T, and van Kreveld, M., "Practical Extensions of Point Labeling in the Slider Model", Proc. 7th Symp. Advantages in Geographic Information Systems, Nov. 1999, pp. 47-52.
Christensen, J., Marks, J. and Shieber, S., "Labeling Point Features on Maps and Diagrams", Technical Report TR-25-92, Center for Research in Computing Technology, Harvard University, 1992, pp. 1-25.
Kakoulis, K.G. and Tollis, I.G., "A Unified Approach to Labeling Graphical Features", Proc. 14th Symp. Computational Geometry, Jun. 1998, pp. 347-356.

(Continued)

*Primary Examiner*—Stephen Hong
*Assistant Examiner*—Kyle Stork
(74) *Attorney, Agent, or Firm*—Daly, Crowley, Mofford & Durkee, LLP

(57) ABSTRACT

A method and apparatus for positioning labels on a graphical display, which, in an illustrative embodiment, can include labels for aircraft icons in an air traffic control system's computer graphics display. The present invention advantageously identifies clusters of overlapping labels and objects, and calculates non-overlapping label positions on a cluster by cluster basis. In another aspect of the present invention, the movement of labels is accomplished in a smooth, incremental fashion so that cognitive distraction to the user of the graphical display terminal is kept to a minimum.

38 Claims, 7 Drawing Sheets

OTHER PUBLICATIONS

Christensen, J., Marks, J. and Shieber, S., "An Empirical Study of Algorithms for Point-Feature Label Placement", ACM Trans. On Graphics 14, 3, Jul. 1995, pp. 203-232.

Christensen, J., Marks, J. and Shieber, S., "Placing Text Labels on Maps and Diagrams", Graphics Gems, Academic Press, Inc., 1994, pp. 497-504.

Azuma et al.; "Visualization Tools for "Free Flight" Air Traffic Management;" 2000 HRL Laboratories; IEEE Computer Graphics and Applications; vol. 20, #5; Sep./Oct. 2000: pp. 32-36.

Azuma et al.; "Visualization of Conflicts and Resolutions in a "Free Flight" Scenario;" HRL Laboratories; IEEE Visualization '99; San Francisco, CA Oct. 24-29, 1999; pp. 433-437.

Bell et al.; "View Management for Virtual and Augmented Reality;" ACM Symp. on User Interface Software and Technology; Orlando, FL; Nov. 14-22, 2001; pp. 101-110.

van Kreveld et al; "Point Labeling with Sliding Labels;" UU-CS-1988-40 University of Utrecht, The Netherlands; Computational Geometry: Theory and Applications: vol. 13. issue 1; May 1999: pp. 1-30.

Christiansen, Jon, Joe Marks, Stuart Shieber. An Empirical Study of Algorithms for Point-Feature Label Placement. ACM Transactions on Graphics 14,3 (Jul. 1995). An extended version by the same authors is in Labeling Point Features on Maps and Diagrams. Technical Report TR-25-92. Center for Research in Computing Tech., Harvard University 1992 (revised Jun. 1994).

A shorter version of this discussion is available in Graphics Gems IV. Paul Heckbert (editor), Cambridge Academic Press, 1994.

\* cited by examiner

US 7,131,060 B1

SYSTEM AND METHOD FOR AUTOMATIC PLACEMENT OF LABELS FOR INTERACTIVE GRAPHICS APPLICATIONS

FIELD OF THE INVENTION

The present invention relates to computer graphics displays. More specifically, the present invention relates to systems and methods for placing of icons in graphics displays.

BACKGROUND OF THE INVENTION

Interactive computer graphics applications frequently require that two-dimensional labels be attached to objects that are displayed on a screen. Such labels provide information about the objects they are related to and are useful for users of such systems. These labels are typically drawn as a two-dimensional overlay on top of the two-dimensional or three-dimensional graphical object rendition that otherwise appears on the graphics display screen. One example of such an application is an air traffic control system where a graphical display of aircraft in flight is rendered on a display screen for use by an air traffic controller in controlling air traffic within a given region of interest. Within the region, for each real aircraft, there is rendered a displayed aircraft icon. Each aircraft icon has a two-dimensional label is attached to it, providing crucial information such as flight number, speed and altitude.

Since the airplanes move in and out of the region of interest over time, so do the aircraft icons and their respective labels. Because the air traffic controllers need ready access to all the information presented on their computer graphical display, it is important to prevent the labels from overlapping each other and other crucial features in the display such as the aircraft themselves. This can cause the information presented to become very difficult to read. In certain circumstances, overlap problems become so severe that the controllers cannot read the labels or other features on the display.

In some air traffic control computer graphical displays, the users must manually reposition the labels so that they do not overlap or hide other useful information. This step requires additional work on the user's part and is, in fact, not even a practical solution in the case of a three-dimensional perspective graphical display, where changing the viewpoint causes large changes in the spatial relationship of the displayed graphical objects.

The problem of how to reposition labels to alleviate the forgoing problems may appear intuitively simple at first, but it is actually quite difficult. The general problem is known to be 'NP-hard' by those of skill in the art. That means that for large problems it is not possible (within the current understanding of computer systems) to generate a system that can find the optimal solution to the problem in a reasonable amount of time. This is because finding the optimal solution requires searching through the entire potential search space. Previous automated label placement schemes do exist, however, all have limitations that result in them being less effective than is needed and desired.

In addition to the air traffic control systems, object label placement on computer graphical displays can be problematic in other applications as well. For example, similar labeling problems occur in command and control displays, which show the location of friendly and enemy units on two-dimensional or three-dimensional displays. Automatic label placement may also eventually be needed in 'Augmented Reality' displays (which display virtual labels over three-dimensional real objects in the environment as a person looks around). Aircraft head-up displays are another example of where object label placement may becomes increasingly important.

The object label placement problem for computer graphics applications is closely related to placement problems for static displays, such as maps. Cartographers have long faced the problem of assigning text labels to map features while avoiding label overlap and covering other important features. There are a number of references, but a good summary and evaluation of existing techniques is provided in: "An Empirical Study of Algorithms for Point-Feature Label Placement", published by Jon Christensen, Joe Marks, and Stuart Shieber in *ACM Transactions on Graphics* 14, 3 (July 1995). An extended version by the same author is provided in *Labeling Point Features on Maps and Diagrams*. Technical Report TR-25-92. Center for Computer Technology, Harvard University, 1992 (revised June 1994). Another version of this discussion is available in *Graphics Gems IV*, Paul Heckbert (editor), Cambridge Academic Press, 1994.

In fact, label placement problems have proven to be NP-hard. For example, in a situation where each aircraft label can be placed in one of twenty positions adjacent to the aircraft, and where there are one-hundred total aircraft in the region of interest and on the graphical display screen, the search space consists of $20^{100}$ total sets of possible positions to evaluate. Clearly, this is far too many to evaluate in any reasonable time frame given the current state of computational technologies. Thus, an NP-hard problem means that there is no way to sufficiently prune this search space to avoid exponential growth caused by the combinatorics of the problem. A conceptual way of thinking about this is to imagine placing one label down on one aircraft. That takes up space that is no longer available for any other label. It is possible that, as labels continue to be placed, the situation will eventually arise where another aircraft label requires the space occupied by the first aircraft's label. Thus, decisions made early on in the label placement process can have ramifications much later in the placement process. The problem grows exponentially as the number of aircraft and possible label positions increase.

Existing label placement algorithms can be divided into two categories: exhaustive search and greedy search. Exhaustive search techniques essentially perform Depth First Searching with various bracketing and pruning heuristics. They are effective only on a small data set and are known to be less practical than greedy search algorithms. Greedy algorithms do not guarantee an optimal solution, however, finish in a practical amount of time by limiting the search space. A wide variety of greedy algorithms exist, ranging from random placement, to force-based methods, to mathematic optimization techniques, and discrete gradient descent (i.e. repositioning one or more randomly-chosen labels simultaneously and keeping the new configuration if it results in an overall improvement). Greedy algorithms in general have trouble escaping from local minima. Local minima are effectively non-optimal solutions that require repositioning large numbers of labels simultaneously to overcome the dangers associated with the solution. One particular algorithm is called 'Simulated Annealing' yields the best results. It is essentially a stochastic gradient descent search that sometimes allows the label placement to change to a worse solution, according to a particular schedule. 'Simulated Annealing' has the characteristic that as the time it is allowed to run approaches infinity, the solution generated approaches the optimum. The references above compare all published algorithms and conclude that Simulated Annealing finds a better solution than all other algorithms for all sizes of data sets.

The problem domain for label placement in an interactive computer graphics environment differs significantly from label placement for static maps and displays. In an interactive computer graphics environment, the three main differences are that; (1) the labeled objects change position with time, (2) little time is available for computing the label positions (a fraction of a second), and, (3) a human user observes the labels as they move around the display. Therefore, the object label placement system should minimize performing actions that distract the user from the underlying tasks. In the case of a static map, a placement system can run for several minutes, or longer, to generate a good solution. In an interactive computer graphics application, the time allotted for such calculations may have to be limited to 100 milliseconds, or less per iteration. Thus, the problem becomes finding a 'good enough' solution within the available time. Simulated annealing is not an appropriate solution for the interactive computer graphics application. The computation time required is too large to support in an interactive application, and it does not give any consideration to the cognitive distraction potentially caused by the solution.

Heuristic methods for interactive computer graphics applications focus on generating solutions with minimal computation and limited exploration of the total search space. Two main types of solutions have been tried, and they are force-based methods and fixed-position methods.

Force-based methods are commonly used in visualization of graphs and other objects. Labels and objects that are not to be covered are given a repulsion force. Other labels that encroach on such an object are 'pushed away' by a repulsion force inversely proportional to the separation distance. These forces are often modeled on springs or gravitational forces. In practice, force-based methods perform poorly respecting the label placement problem. They are vulnerable to getting stuck in local minima, even in simple cases. For example, when two aircraft cross paths, their associated labels can get stuck on the opposite sides because the repulsive forces prevent them from crossing paths. The optimum solution is for the two labels to swap positions, but the force-based technique instead pushes the labels in the opposite directions. Force-based schemes also perform poorly in the area of minimizing cognitive distractions. Labels stuck in between other labels or objects are jostled about; resulting in oscillations and wiggling that attract unwarranted user attention.

Another approach is the examination of a fixed number of label positions about an object. In general, this is a locally greedy approach with no backtracking. Each aircraft has a fixed number of positions where the labels can be placed in positions spaced equally about and relative to the aircraft icon. For example, there may be eight positions equally spaced about a circle with the aircraft icon located at the center of the circle. The system then iterates through all the aircraft icons on the display, one by one, in some order. For each aircraft, it checks all eight spaces to see which are empty, and puts the label in an empty position (if available, in the preferred location, such as the upper right corner). If none are empty, it picks one of the positions that causes the least amount of overlap. This method is efficient because of its simplicity and can generate reasonable results. However, it is very susceptible to local minima, and in practice the labels placed according to these solutions tend to oscillate.

Thus there is a need in the art for a method and apparatus for placing two-dimensional labels on an interactive computer graphics display.

SUMMARY OF THE INVENTION

The need in the art is addressed by the apparatus and methods of the present invention. In one embodiment, the invention comprises an apparatus for positioning labels among graphical elements on a computer graphics display and includes a means for identifying at least a first cluster of overlapping labels and graphical elements, a means for calculating new display coordinates for at least one label in the cluster, and a means for moving the label in accordance with the new display coordinates.

In a refinement of this invention, the means for identifying further comprises a means for sequentially selecting labels from a plurality of labels on the display, a means for testing each of the selected labels for overlap with other labels and graphical elements in the display, a means for accumulating an overlap score for each of the selected labels, a means for generating a list of other labels and graphical elements that overlap each of the selected labels, a means for comparing a plurality of the lists and accumulating cluster lists of overlapping labels and graphical elements, and a means for sorting a plurality of the cluster lists according to the number of entries in each.

In another refinement, the overlap score is based on the degree of severity of overlap between labels and graphical elements. In another refinement, the labels are determined to be overlapping other labels or graphical elements when they are mutually overlapping. In another refinement, the labels are determined to be overlapping other labels or graphical elements when they are mutually or transitively overlapping. In another refinement, the means for sorting orders the sort from largest cluster list to smallest cluster list. In another refinement, the means for calculating further comprises a means for comparing the degree of overlap of labels and graphical elements with the new display coordinates and the existing degree of overlap of labels and graphical elements.

In another refinement, the new display coordinates are calculated according to a stochastic method. In another refinement, the new display coordinates are calculated according to a heuristic method. In yet another refinement, the means for moving further comprises a means for interpolating a plurality of intermediate display coordinates between the existing display coordinates and the new display coordinates, and a means for sequentially placing the labels at each of the intermediate display coordinates before placing the labels at the new display coordinates, thereby smoothing the movements of the labels on the display.

The present invention also teaches several methods of positioning labels among graphical elements on a computer graphics display. A first method comprises the steps of identifying at least a first cluster of overlapping labels and graphical elements, calculating new display coordinates for at least one label in the cluster, and moving the label in accordance with the new display coordinates.

Another method of positioning labels among graphical elements on a computer graphics display is also taught. It comprises the steps of sequentially selecting labels from a plurality of labels on the display, testing each of the selected labels for overlap with other labels and graphical elements in the display, accumulating an overlap score for each of the selected labels, generating a list of other labels and graphical elements that overlap each of the selected labels, comparing a plurality of the lists and accumulating cluster lists of overlapping labels and graphical elements, sorting a plurality of the cluster lists according to the number of entries in each, calculating new display coordinates for the labels on a cluster by cluster basis, comparing, on a cluster by cluster basis, the degree of overlap of labels and graphical elements with the new display coordinates and the existing degree of overlap of labels and graphical elements, and if the new coordinates result in a reduction of the degree of overlap, moving the graphical elements to new positions according to the calculated display coordinates.

In another embodiment, the overlap score is based on the degree of severity of overlap between labels and graphical elements. In another refinement, the labels are determined to be overlapping other labels or graphical elements when they are mutually overlapping. In another refinement, the labels are determined to be overlapping other labels or graphical elements when they are mutually or transitively overlapping. In another refinement, the sorting is ordered from largest cluster list to smallest cluster list. In another refinement, the new display coordinates are calculated according to a stochastic method. In another refinement, the new display coordinates are calculated according to a heuristic method. In another refinement, the calculating of new display coordinates is ordered according to the cluster list. In yet another refinement, the moving step further comprises the steps of interpolating a plurality of intermediate display coordinates between the existing display coordinates and the new display coordinates, and sequentially placing the labels at each of the intermediate display coordinates before placing the labels at the new display coordinates, thereby smoothing the movements of the labels on the display. In yet another refinement, the method further includes the step of repeating the foregoing sequence of steps through a plurality of iterations.

These and other objects, aspects, features and advantages of the invention will become more apparent from the following drawings, description and claims.

DESCRIPTION OF THE INVENTION

Illustrative embodiments and exemplary applications will now be described with reference to the accompanying drawings to disclose the advantageous teachings of the present invention. While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches a novel apparatus and method for automatically placing two-dimensional labels that are associated with certain graphical objects in an interactive computer graphics display, so that the labels avoid overlapping each other and other objects on the display. This saves the user the effort of doing the task manually. The present invention comprises a computer-implemented software system that cooperates with a processor or controller at interactive rates in an interactive computer graphics application. One aspect of the present invention is the way in which it approaches the search space of potential locations for each label. As was discussed hereinbefore, the entire search space is typically too large to examine exhaustively in the time available. To alleviate this limitation, the present invention analyzes the positions of the labels recognizing clusters of labels that it can efficiently search, thereby reducing the total search space to a tractable level. In one embodiment, the present invention also minimizes the cognitive distractions to the user caused by changing label positions by changing their position smoothly and in one embodiment, generally avoiding moving labels unless it is advantageous to do so to prevent overlaps.

Figure 1:
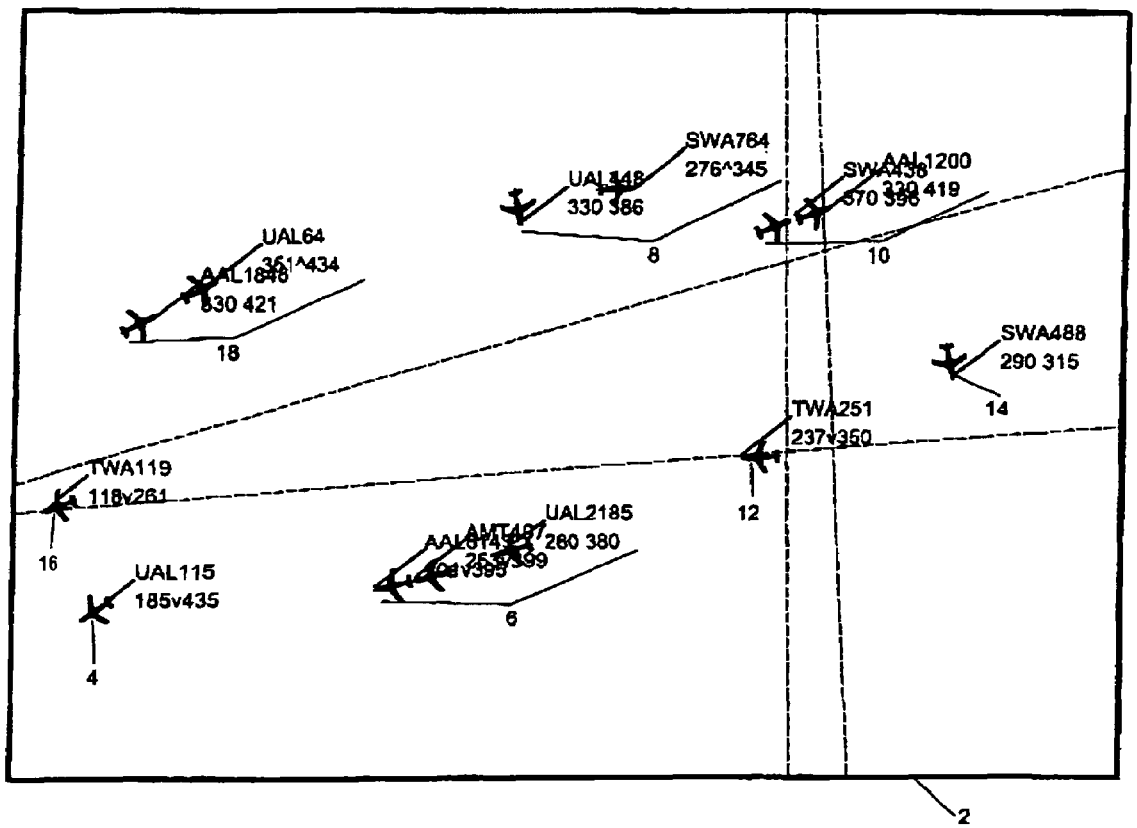
FIG. 1 is an exemplary computer graphics display.

Reference is directed to FIG. 1, which is a drawing of a graphical display 2 in an air traffic control system's controller workstation. The display 2 encompasses a region of interest, for example, a physical region of interest in which multiple aircraft are operating. Several aircraft icons, and their associated labels, are located in open regions, such as the aircraft identified by numerals 16, 4, 12, and 14. For purposes of this description, it is to be appreciated that the interchangeable use of the terms "aircraft icon", "icon" or "aircraft", can mean a symbol representative of an aircraft and/or its label. Referring again to FIG. 1, the placement of the aircraft shows that there is no problem related to observation of the aircraft and its related label by the user. At least not until the aircraft move relative to one another possibly causing overlapping of the aircraft icons and any additional information on the graphical display. Other clusters of aircraft can be located so close to one another that they, and/or their labels, overlap, such as those clusters of aircraft identified by numerals 18, 8, 10, and 6. In addition to the aircraft and labels, air traffic control displays often times include other objects of import, such as airports, markers, and obstacles, hereinafter referred to as graphical objects. For purposes of this description, it is to be appreciated that the interchangeable use of the terms "graphical object", "object" or "icon", can mean a symbol representative of non-aircraft objects in a region of interest.

Figure 2:
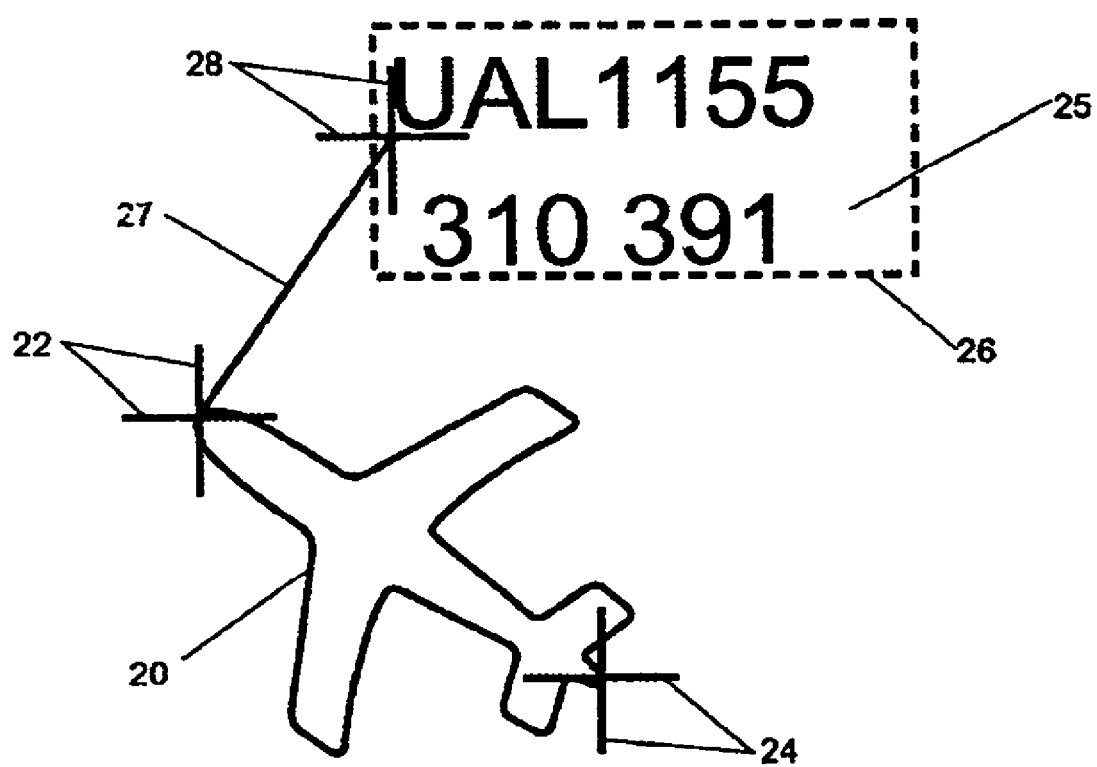
FIG. 2 is a diagram of a graphical element and its related label in a computer graphical display.

In a computer graphics display, the computer draws the aircraft icons and labels onto the display according to values provided through calculation. Reference is directed to FIG. 2, which details a single aircraft icon and its label. The nose position, indicated by cross-hairs 22, and its tail position, indicated by cross hairs 24, locate the aircraft icon 20. Given these two positions, which are typically dimensioned in pixels, the aircraft icon position and orientation are determined and the display drawn. A label 25 is located adjacent to the aircraft icon and the dimensions and location of a box 26 enclosing the label are known. In order to connect a given label 25 to its aircraft icon 20, a line 27 is drawn from a point on box 26, indicated by cross-hairs 28, to the nose 22 of the aircraft icon. One task of the labeling system of the present invention is to select a position for each label, relative to its aircraft icon, that minimizes the overlap of each label with any other labels or objects on the display.

The relationship between each label and its icon is described mathematically, according to the distance from the nose of the aircraft icon to the label, and the angle of rotation of the label position relative to a reference angle (usually up or north). Thus the relative label position is described by the variables:

| | |
|---|---|
| label_r | The distance, or radius, from the icon to the label, expressed in pixels, and |
| label_a | The angle, expressed in radians. |

Given the known coordinates of the nose position of the aircraft icon, the relative location of the label, expressed in a Cartesian coordinate system (x,y) of pixels is:

| | | |
|---|---|---|
| x=radius*cos(angle) | or | x=(label_r)cos(label_a) |
| | and | |
| y=radius*sin(angle) | or | y=(label_r)sin(label_a) |

There could be any number of positions for labels with respect to the nose of the aircraft icon. Since the number of positions is one dimension in the search space, it is useful to select a number of alternative positions that meets the needs of label placement systems without unduly expanding the search space dimensions.

Figure 3:
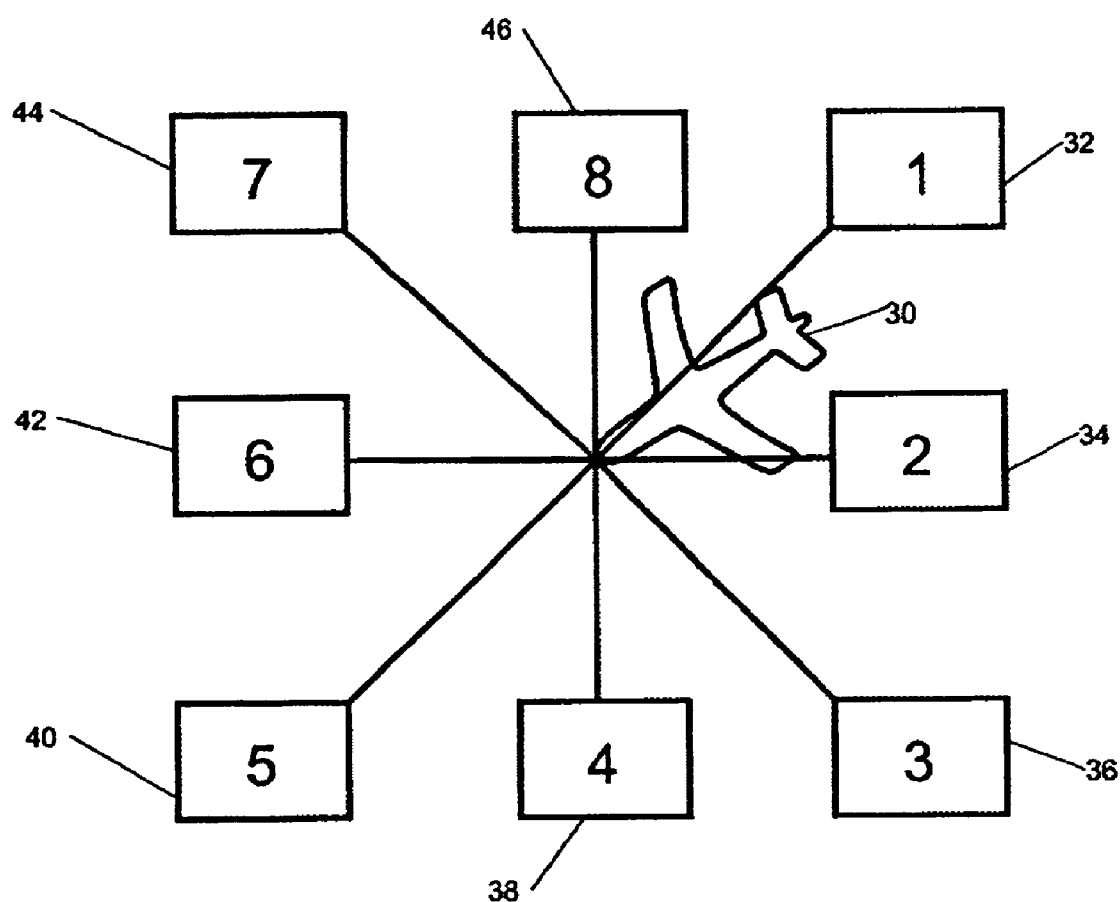
FIG. 3 is a diagram illustrating possible label placement with respect to a graphic element in a computer graphical display.

Reference is directed to FIG. 3, which is a diagram of label positions illustrating eight possible positions. The aircraft icon 30, and it nose position, serve as the center of the label position circle. In one embodiment, the default label position is π/4 radians clockwise from straight up, indicated by position 1, 32 in FIG. 3. The other label positions are located at π/4 increments around the label circle, and include positions 2, 3, 4, 5, 6, 7, and 8, illustrated by items 34, 36, 38, 40, 42, 44, and 46 respectively. The distance, or radius, that the labels are placed from the nose of the aircraft 30 in an illustrative embodiment ranges form twenty pixels to seventy-five pixels, with thirty pixels being the preferred default value.

One aspect of the present invention is an analysis of screen area problem locations, resulting in clusters of labels and graphic objects that are individually processed such most of the local minima problems are avoided. In one embodiment, the cluster approach advantageously avoids moving any labels, relative to their respective graphical objects, that are judged to not currently be causing an overlap problem. Labels that are moved to new locations are moved smoothly to minimize user distractions. While other systems simply jump the label from the old position to the new position, this routine smoothly moves the label from the old to the new position over time by an interpolation scheme.

The present invention does not always generate an optimum label placement solution, and there are situations where its performance is limited. For example, if the density of the objects to be labeled is so high that there is simply not enough display screen space to place the labels without significant overlap, then the present invention can, in one embodiment, continually move the labels around with a low probability of finding a good solution. However, no scheme that is practical to run at interactive rates will perform well under those circumstances, and in real applications users will not typically allow object densities to become this high because they will not be able to perform their tasks.

Figure 4:
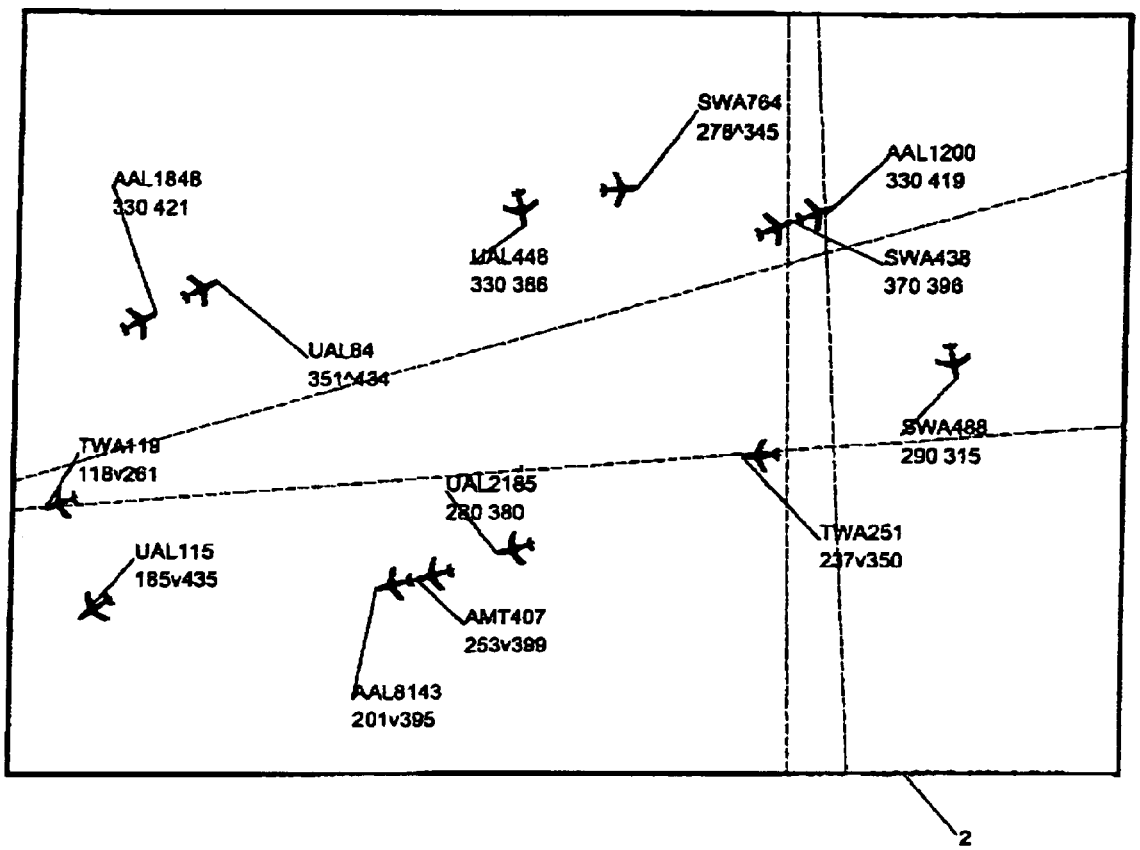
FIG. 4 is a drawing of a computer graphics display in an illustrative embodiment of the present invention.

Reference is directed to FIG. 4, which is an exemplary diagram of a computer graphics display screen 2 in an air traffic control system that has been processed according to the present invention. The aircraft icon placement is the same as was illustrated in FIG. 1. However, the labels have been placed in such a manner that overlapping has been eliminated, thereby greatly enhancing the readability of the display for the users.

In an illustrative embodiment of the present invention for each aircraft, a label data structure of position variables is maintained for drawing the label associated with that aircraft to the display scene. Four pertinent variables in this data structure are:

label_r_start
label_r_dest
label_a_start
label_a_dest

All four of these variables are floating point numbers. The first two represent the start and destination values for the radius of the label with respect to the nose of the aircraft icon, in pixels. The last two represent the start and destination values for the angle, in radians. In one embodiment, the label radius has a minimum value of 20 pixels and a maximum value of 75 pixels, and the radius valves range from 0 to 2π radians. When an aircraft first becomes visible on the display scene, the start radius and start angle of the label are initialized to default base values such as, for example 30 pixels and π/4 radians, however, it is to be appreciated that other default base values can be chosen. The relative position with respect to the aircraft nose (in pixels) is specified in x and y offsets as follows:

$x$=radius*cos(angle)

$y$=radius*sin(angle)

Figure 5:
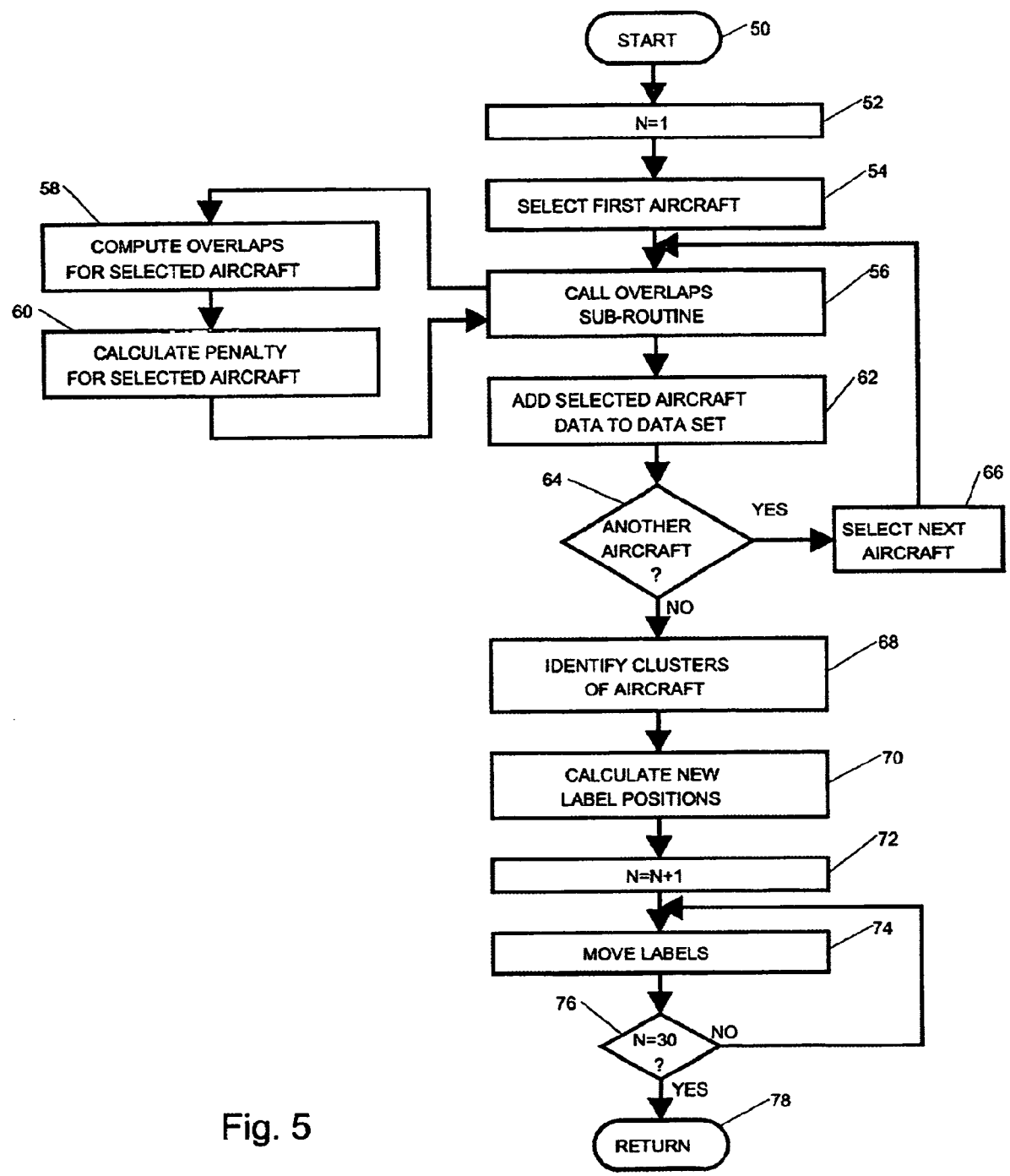
FIG. 5 is a flow diagram of an illustrative embodiment of the present invention.
Figure 6:
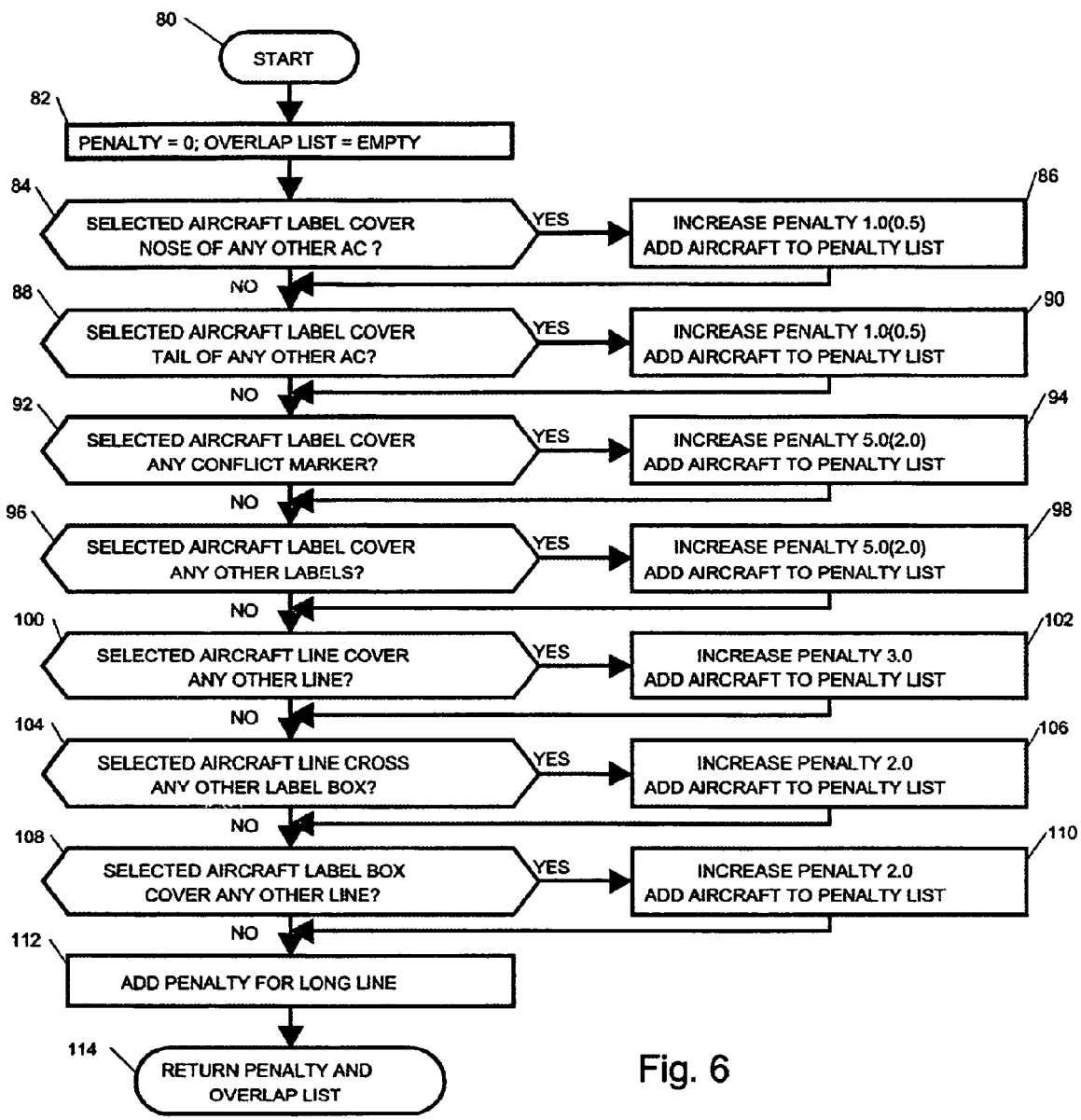
FIG. 6 is a flow diagram of an illustrative embodiment of the present invention.

Reference is directed to FIG. 5, which illustrates an illustrative embodiment of the present invention. In the present embodiment, the overall process runs in a large event loop, where each time the loop is executed is considered a single iteration. The loop is entered at step 50 and exited at step 78. The process that calls it iteratively is not illustrated. In a typical application, the program may exceed twenty iterations per second, depending on the computational load and the machine it runs on. In one embodiment the label placement system operates as follows. For every N iterations, where N equals 30 for purposes of this example, the system computes a new set of locations for each visible label. This means that new values for the label_r_start, label_r_dest, label_a_start, and label_a_dest variable are calculated for each aircraft icon. During the 29 other iterations, the system uses those four values to smoothly interpolate the label positions from their starting positions to their destinations. Therefore, the description of how the system works can be divided into two main parts: how to pick the new label locations, and how to smoothly move the labels to the new location once those have been determined. A major sub-routine of the first task is the computation of label overlaps and the penalty function that scores the 'cost' of how bad the overlap is. These are illustrated in FIG. 6, discussed hereinafter.

Referring again to FIG. 5, at the time the label system is called in the overall program, a main air traffic software program has already rendered, (for aircraft that are currently visible) the two-dimensional or three-dimensional aircraft icons on a display. The two-dimensional coordinates of the nose and tail of each aircraft model are thus computed by standard computer graphics techniques and recorded in memory. The label system also uses a subroutine called "COMPUTE OVERLAPS" which is described in greater detail with reference to FIG. 6. This subroutine, given an aircraft and the two-dimensional coordinates for its associated label, determines which other aircraft it overlaps and returns the list of those aircraft and a penalty score, indicating how 'costly' the overlaps are.

The philosophy behind the present invention is to identify clusters of overlapping aircraft icons, labels and other graphical objects such as, for example, markers, collision points, the jetway line, etcetera, which are then searched for solutions to prevent overlap in a stochastic manner. The system of the present invention can solve the more difficult overlap problems first, such as, for example, problems involving clusters of aircraft icons with label and object overlaps. In one embodiment of the present invention, these clusters can be identified and solved individually without affecting all other aircraft icons on the display.

Again referring to FIG. 5, after the entry point 50, the process initializes the iterative counter 'N' to equal one at step 52. A first aircraft icon is selected from the display at step 54. The process next calls the 'COMPUTE OVERLAPS' subroutine at step 56. The details of this routine will be more fully developed hereinafter in connection with FIG. 7. The subroutine is sent the aircraft icon display data and has access to all the content of the graphical display scene. The 'COMPUTE OVERLAPS' subroutine, as illustrated by step 58, computes overlaps for selected aircraft, and step 60, calculates penalties for selected aircraft in FIG. 5. This subroutine returns a penalty, which is an overlap score, or cost value and a list of objects and labels that have been overlapped. The overlap score is generated based on the number of overlapping icons and/or the degree to which the icons overlap. The overlap score is compared against a certain threshold value to determine if, in fact, the overlap exists. The returned score data is entered into a data set at step 62. At step 64, the process checks the display data to determine if any other aircraft icons have yet to be analyzed for overlaps. If additional aircraft icons exist, the next aircraft icon is selected at step 66, and flow recycles to step 56 where this foregoing process begins anew. On the other hand, at step 64, if no other aircraft icons remain, flow continues to step 68 where clusters are identified.

The details of how clusters are identified will be discussed with reference to FIG. 7 hereinafter. Essentially, in an illustrative embodiment, a cluster can be defined as a group of aircraft icons that transitively overlap each other, or alternatively as a group of aircraft icons and graphical object icons that overlap each other. For example, say that aircraft A overlaps aircraft B, and aircraft B overlaps aircraft C, but aircraft A does not overlap aircraft C. Then A, B, and C transitively fall into one cluster. The cluster identification system computes clusters by clearing or emptying an existing or previously obtained list of clusters and then iterating through each visible aircraft on the display. If an aircraft icon has overlaps which, as further discussed above, can be determined by comparing an overlap score with a predetermined threshold value, then the system determines whether this aircraft exists in a previously created cluster. If a determination is made that this aircraft does so exist, then the aircraft that overlap this aircraft are added to the current cluster along with this aircraft. Using the above example, if A and B already form an existing cluster and aircraft B is analyzed, the system of the present invention would determine that B overlaps with C. The system would further determine that B already exists in a cluster with A. In turn, C would then be added to the existing cluster and the cluster would therefore form a group comprising aircraft A, B and C. If for example, the system analyzes a new aircraft, D, and that aircraft overlaps with another aircraft E, and D does not exist in a previously created cluster, a new cluster is created and those overlapping aircraft and any other graphical objects are put into a new cluster along with this aircraft. Assuming for purposes of illustration only that E is the only overlapping icon, the system would create a new cluster D, E. After this process is performed, the system again can again checks the clusters to determine if any aircraft still exist in multiple clusters. Therefore, the system checks the cluster it has just created or the cluster into which it inserted a new aircraft icon against all other clusters. If there is any duplication of aircraft, then those clusters are merged together. Therefore, by way of example, should the system determine that D already exists in a cluster with A elsewhere, the D,E would be added to the A,B,C cluster, forming a single cluster comprising aircraft A,B,C,D,E.

It is important to note, however, that the cluster lists may not include all of the visible aircraft. For example, if an aircraft does not overlap another aircraft or graphical object, and it itself is not overlapped by another aircraft or graphical object, then, in the present embodiment, it will not exist in a cluster and its label position will not be moved. This feature of the present embodiment allows the system to avoid moving labels that are not currently causing any problems, thus minimizing user distraction.

After the above described iterations are done, in the present embodiment, the list of clusters can be sorted by the number of aircraft in each cluster, so that the largest clusters are accorded a higher priority, and the smallest clusters are accorded a lesser priority, for purposes of order of later processing. The system can then proceed to manage the overlaps existing in the larger clusters first. It is to be appreciated that in alternate embodiments of the invention the clusters can be sorted according to different requirements or considerations, such as, for example, the extent to which an aircraft overlaps with graphical objects, or the extent to which clusters are in proximity to certain areas of the airport. It is to be further appreciated that in alternate embodiments of the invention the clusters need not be sorted.

The IDENTIFY CLUSTERS subroutine, step 68 in FIG. 5 in one embodiment, as described above returns an ordered list of clusters. At step 70, new label positions can be calculated for each cluster of aircraft. This task involves setting the new values for label_r_start, label_r_dest, label_a_start, and label_a_dest for each aircraft. By way of example, let the current iteration number be k, and the previous iteration shall be (k−1). Then the start values for each visible aircraft are set as follows:

label_r_start(k)←label_r_dest(k−1)
label_a_start(k)←label_a_dest(k−1)

What remains is to set new values for the label_r_dest and label_a_dest. In one embodiment the initial settings are simply the ones that previously existed. That is, initially:

label_r_dest(k)←label_r_dest(k−1)
label_a_dest(k)←label_a_dest(k−1)

The system can then process each cluster to determine whether the repositioning of the labels associated with the clusters is preferable. In the present embodiment, the system processes the largest clusters prior to processing the smaller clusters. For each cluster, several new sets of label positions, label_r_dest, label_a_dest are chosen and evaluated for all the aircraft icons in that cluster. These numbers of new sets chosen can vary, depending on the desired number of alternate destination values the user configures the system to supply. In one embodiment the number of sets created can be set to equal 25 if there is only one aircraft in the cluster. One aircraft can exist in a cluster in a situation where one aircraft icon or its label overlaps with graphical objects, such as, for example in the case of an aircraft overlapping with markers or collision points. In another embodiment, the number of sets created can equal 40 if 2 or 3 aircraft exist in the cluster, and the number of sets can equal 75 if 4 or more aircraft exist in a cluster. It is to be appreciated by those skilled in the art that the number of sets can differ from those above while remaining within the scope of the present invention.

In another embodiment, one of the sets of label positions can include only the base or default positions for each of the aircraft labels in the cluster, and another set of label positions can include only the current position of the aircraft labels in the cluster. By including a default set and a current position set, the system of the present invention insures that a new solution to reposition the labels having a greater overlap cost than the current solution will not be chosen. In the present embodiment, the remaining sets can be chosen randomly. In alternate embodiments, certain non-random algorithmic methods can be used to generate sets. In another embodiment, for each aircraft in the cluster, the proposed new label values for radius and angle can be chosen such that the radius stays within a predetermined minimum and maximum radius value, and the angle ranges from 0 to $2\pi$ radians.

After generating the sets of label positions, each set can then evaluated for a total penalty cost. This cost is the sum of all the penalty costs computed for each aircraft in the cluster, as computed by the 'compute overlaps' subroutine. The system can then selects the set that has the lowest overall cost and sets the label_r_dest and label_a_dest values for all aircraft in the cluster to the values in that set. With respect to the label positions of the aircraft not in the cluster currently being examined, such positions can remain, until the system processes such clusters, at their current label_r_dest and label_a_dest values. In the present embodiment, to minimize user distraction, the aircraft icons that are not part of any cluster need not have their labels repositioned. It is important to note however, that in alternate embodiment, all aircraft labels can be repositioned including those not existing in a cluster.

By using the foregoing approach, the system can complete the repositioning task in a reasonable amount of time. In the event, however, that the system does not find a preferred solution to the overlapping of icons in an iteration, in one embodiment, the system can reset the labels to their existing position. By doing so, the system will have a greater likelihood of finding a good solution during a subsequent iteration. For example, N iterations later, when the system reexamines the clusters, it will generate a new group of randomly chosen solution sets, thus increasing the probability that a preferred repositioning solution will be found. In one embodiment, the system spreads out the computation load over time, preserving the real time interaction while progressively refining the solution over time.

Referring again to FIG. 5, after the new label positions have been calculated at step 70, the flow continues to step 72 where the iterative counter is incremented. Then to step 74 where the label movements process begins. This process if further described below in FIG. 8. The sequence of moving the labels take a number of steps, and for purposes of illustration in the present example, the number of steps is 29, as set by the counter in step 76. The counter 76 recycles flow through the movement step 74 until all the movements are complete and then flows to step 78 where the process returns to the main, calling process.

At step 74, the movement routine smoothly moves labels form their original position to their destination positions. In the present embodiment, during the iterations in which the new label positions are not being computed, the display smoothly moves the labels from their initial to their final positions. This is done by computing intermediate label positions based on the current iteration number, N. In an illustrative embodiment, the intermediate label positions are generated based on a linear interpolation from the start to the destination values. First, a fraction value is computed. The fraction is computed as:

Fraction=2.0*(cycle/$N$)

If (fraction>1.0)then fraction=1.0

Initially, the cycle variable is equal to one and then increments with N, where N is the number of iterations it takes to choose the destination label position, which in the present example can equal 30. When new label positions are chosen, the cycle variable can be set to zero.

Thereafter, each visible aircraft's label radius and angle is set by linearly interpolating between label_r_start and label_r_dest, and label_a_start and label_a_dest, using the fraction value. A fraction of 0.0 means that the radius and angle values are set to the start values and a fraction of 1.0 means they are set to the destination values. Fractions in between result in radii and angle values that are linear interpolations between the start and destination values. Since there is a discontinuity in angles between 0 and $2\pi$, in one embodiment, the system can avoid potential discontinuity and select a rotation direction that minimizes the total rotation angle.

Reference is directed to FIG. 6, which is a flow diagram of the 'compute overlaps' subroutine in an illustrative embodiment of the present invention. The process is entered at step 80 and proceeds to step 82 where the PENALTY count is set to zero and the OVERLAP LIST is cleared or emptied. At step 84 the label of the selected aircraft is tested to determine if it covers the nose of any aircraft. If it does, at step 86, the PENALTY count is incremented by 1.0. If it is close to an overlap, the PENALTY count is incremented by 0.5. In either case, the overlapped object is added to the OVERLAP LIST. At step 88 the label of the selected aircraft is tested to determine if covers the tail of any aircraft. If it does, at step 90, the PENALTY count is incremented by 1.0. If it is close to an overlap, the PENALTY count is incremented by 0.5. In either case, the overlapped object is added to the OVERLAP LIST. At step 92 the label of the selected aircraft is tested to determine if it covers any conflict markers on the display. If it does, at step 94, the PENALTY count is incremented by 5.0. If it is close to an overlap, the PENALTY count is incremented by 2.0. In either case, the overlapped object is added to the OVERLAP LIST. At step 96 the label of the selected aircraft is tested to determine if it covers any other label. If it does, at step 98, the PENALTY count is incremented by 5.0 it is added to the OVERLAP LIST. If it is close to an overlap, the PENALTY count is incremented by 2.0 but it is not added to the OVERLAP LIST. At step 100 the aircraft to label line of the selected aircraft is tested to determine if it covers the line of any other aircraft. If it does, at step 102, the PENALTY count is incremented by 3.0. Then the overlapped object is added to the OVERLAP LIST. At step 104 the aircraft to label line of the selected aircraft is tested to determine if covers the label box of any other aircraft. If it does, at step 106, the PENALTY count is incremented by 2.0. Then the overlapped object is added to the OVERLAP LIST. At step 108 the label box of the selected aircraft is tested to determine if it covers the line of any other aircraft. If it does, at step 110, the PENALTY count is incremented by 2.0. Then the overlapped object is added to the OVERLAP LIST. Finally, at step 112, this routine adds a small penalty based on how far the proposed new label radius and angle are from the ideal base radius and angle values. The further away from the base value the label position is, the larger the penalty. This encourages label positions to be chosen close to the base (if no other overlap problems occur)). In one embodiment, a penalty for such condition is given only if this label does not overlap any other aircraft. This subroutine returns the final penalty value and the overlap list at step 114. It is to be further appreciated that in alternate embodiments of the present invention, less than all of the above steps may be performed.

Figure 7:
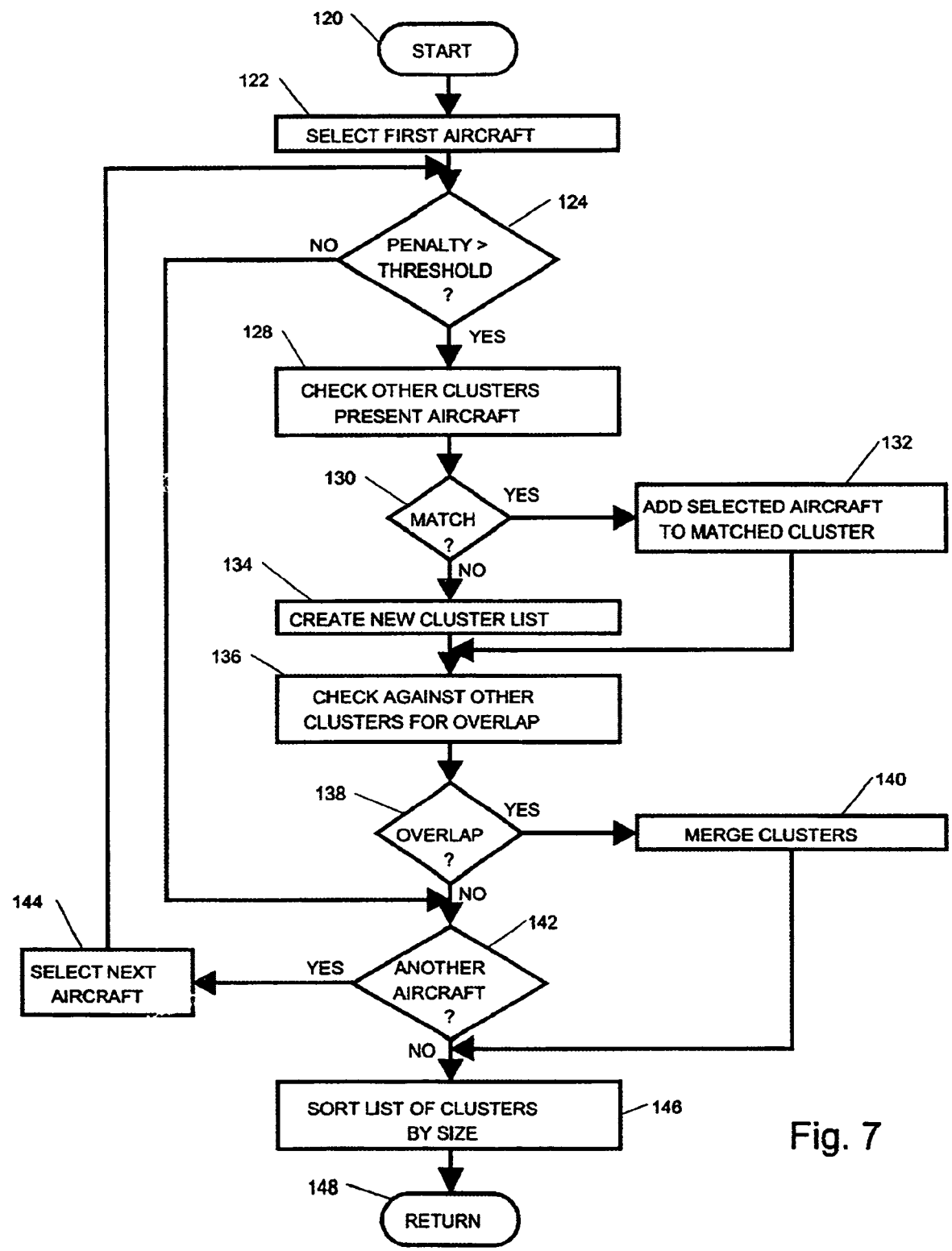
FIG. 7 is a flow diagram of an illustrative embodiment of the present invention.

Reference is directed to FIG. 7, which is a flow diagram of the COMPUTE OVERLAPS subroutine. The process is entered at step 120 and proceeds to step 122 where the first aircraft on the display is selected. At step 124, the penalty threshold value for the selected aircraft is read. If it is below a certain threshold, indicating that the aircraft does not overlap other objects, then the process goes to step 142. On the other hand, at step 124, if it does exceed the threshold, then there is an overlap, and flow continues to step 128. At step 128, the process checks to determine if the selected aircraft is a member of any other clusters. If it is, at step 132, then the selected aircraft is added as a member of that cluster, and flow continues on to step 136. On the other hand, at step 130, if the selected aircraft is not a member of any other cluster, then a new cluster is created at step 134, comprising the selected aircraft and the object with which it overlaps.

At step 136, the process checks to determine if the selected aircraft is a member of any other clusters. This could occur if a previously selected aircraft overlapped with the presently selected aircraft, causing it to be included in the previous aircraft's cluster list. If there is an overlap with another cluster at step 138, the clusters are merged at step 140. This is because of the transitive nature of clusters discussed hereinbefore. Flow then proceeds to step 146. On the other hand, at step 138, if there was no cluster overlap, then flow proceeds to step 142 where the process checks to determine if another aircraft remains to be tested. If so, then such aircraft is selected at step 144 and flow recycles to step 124. If no other aircraft remain, flow proceeds to step 146. At step 146, the clusters are sorted according to the number of graphical objects they contain. Then, the process returns at step 148.

Thus, the present invention has been described herein with reference to a particular embodiment for a particular application. It is therefore intended by the appended claims to cover any and all such applications, modifications and embodiments within the scope of the present invention.

Accordingly,

What is claimed is:

1. An apparatus for positioning labels among graphical elements on a computer graphics display, comprising:
    a display, and
    a processor coupled to said display and operable to identify at least a first cluster of overlapping labels on said display, and operable to calculate initial display coordinates in accordance with an initial position of at least one label in said cluster, to calculate new display coordinates in accordance with a new position of said at least one label in said cluster having less overlap, to display said at least one label at said initial display coordinates, and to move said at least one label on said display from said initial display coordinates to said new display coordinates, wherein said processor is operable to sequentially select labels from a plurality of labels on said display, and to test each of said selected labels for overlap with other labels or graphical elements in said display, and said processor is operable to accumulate an overlap score for each of said selected labels, and operable to generate a list of other labels and graphical elements that overlap each of said selected labels, and operable to compare a plurality of said lists and accumulate cluster lists of overlapping labels and graphical elements, and operable to sort a plurality of said cluster lists according to the number of entries in each.

2. An apparatus for positioning labels among graphical elements on a computer graphics display, comprising:
    means for identifying at least a first cluster of overlapping labels, wherein said means for identifying includes,
        means for sequentially selecting labels from a plurality of labels on the display;
        means for testing each of said selected labels for overlap with other labels or graphical elements in the display;
        means for accumulating an overlap score for each of said selected labels;
        means for generating a list of other labels and graphical elements that overlap each of said selected labels;
        means for comparing a plurality of said lists and accumulating cluster lists of overlapping labels and graphical elements; and
        means for sorting a plurality of said cluster lists according to the number of entries in each;
    means for calculating initial display coordinates for at least one label in said cluster;
    means for calculating new display coordinates for said at least one label in said cluster; and
    means for moving said label on the display from an initial position in accordance with said initial display coordinates to a new position in accordance with said new display coordinates.

3. The apparatus of claim 2 wherein said overlap score is based on a degree of overlap of labels and graphical elements.

4. The apparatus of claim 2 including means for determining that the labels are overlapping other labels or graphical elements when they are mutually overlapping.

5. The apparatus of claim 2 including means for determining that the labels are overlapping other labels or graphical elements when they are transitively overlapping.

6. The apparatus of claim 2 wherein said means for sorting orders the sort from largest cluster list to smallest cluster list.

7. The apparatus of claim 2 wherein said means for calculating further comprises:
    means for comparing the degree of overlap of labels and graphical elements with said new display coordinates and the existing degree of overlap of labels and graphical elements.

8. The apparatus of claim 2 including means for calculating said new display coordinates according to a stochastic method.

9. The apparatus of claim 2 including means for calculating said new display coordinates according to a heuristic method.

10. The apparatus of claim 2 wherein said means for moving further comprises:
- means for interpolating a plurality of intermediate display coordinates between said initial display coordinates and said new display coordinates; and
- means for sequentially placing the labels at each of said intermediate display coordinates before placing said labels at said new display coordinates, thereby smoothing the movements of said labels on said display.

11. An apparatus for positioning labels among graphical elements on a computer graphics display, comprising:
- means for sequentially selecting labels from a plurality of labels on the display;
- means for testing each of said selected labels for overlap with other labels and graphical elements in the display;
- means for accumulating an overlap score for each of said selected labels;
- means for generating a list of other labels and graphical elements that overlap each of said selected labels;
- means for comparing a plurality of said lists and accumulating cluster lists of overlapping labels and graphical elements, each cluster list representing a respective cluster of overlapping labels;
- means for sorting a plurality of said cluster lists according to the number of entries in each;
- means for calculating initial display coordinates for the labels on a cluster by cluster basis;
- means for calculating new display coordinates for the labels on a cluster by cluster basis;
- means for comparing, on a cluster by cluster basis, the degree of overlap of labels and graphical elements at said new display coordinates and the degree of overlap of the labels and graphical elements at the initial coordinates; and
- means for moving the graphical elements on the display from initial positions according to said initial display coordinates to new positions according to said new display coordinates if said new display coordinates result in a reduction of the degree of overlap.

12. The apparatus of claim 11 wherein said overlap score is based on the degree of overlap between labels and graphical elements.

13. The apparatus of claim 11 wherein labels are determined to be overlapping other labels or graphical elements when they are mutually overlapping.

14. The apparatus of claim 11 wherein labels are determined to be overlapping other labels or graphical elements when they are transitively overlapping.

15. The apparatus of claim 11 wherein said means for sorting orders the sort from largest cluster list to smallest cluster list.

16. The apparatus of claim 11 wherein said new display coordinates are calculated stochastically.

17. The apparatus of claim 11 wherein said new display coordinates are calculated heuristically.

18. The apparatus of claim 11 wherein said calculating of new display coordinates is ordered according to said cluster list.

19. The apparatus of claim 11 wherein said means for moving further comprises:
- means for interpolating a plurality of intermediate display coordinates between said initial display coordinates and said new display coordinates and
- means for sequentially placing the labels at each of said intermediate display coordinates before placing said labels at said new display coordinates, thereby smoothing the movements of said labels on said display.

20. A method of positioning labels among graphical elements on a computer graphics display, comprising the steps of:
- identifying at least a first cluster of overlapping labels and graphical elements wherein said identifying comprises:
  - sequentially selecting labels from a plurality of labels on the display;
  - testing each of said selected labels for overlap with other labels and graphical elements in the display;
  - accumulating an overlap score for each of said selected labels;
  - generating a list of other labels and graphical elements that overlap each of said selected labels;
  - comparing a plurality of said lists and accumulating cluster lists of overlapping labels and graphical elements; and
  - sorting a plurality of said cluster lists according to the number of entries in each;
- calculating initial display coordinates for at least one label in said cluster;
- calculating new display coordinates for said at least one label in said cluster; and
- moving said label on the display from said initial display coordinates to said new display coordinates.

21. The method of claim 20 wherein said overlap score is based on the degree of overlap between labels and graphical elements.

22. The method of claim 20 wherein labels are determined to be overlapping other labels or graphical elements when they are mutually overlapping.

23. The method of claim 20 wherein labels are determined to be overlapping other labels or graphical elements when they are transitively overlapping.

24. The method of claim 20 wherein said sorting is ordered from largest cluster list to smallest cluster list.

25. The method of claim 20 wherein said calculating step further comprises the step of:
- comparing the degree of overlap of labels and graphical elements with said new display coordinates and an existing degree of overlap of labels and graphical elements with said initial display coordinates, and if the new coordinates result in a reduction of the degree of overlap, proceeding to said moving step.

26. The method of claim 20 wherein said new display coordinates are calculated according to a stochastic method.

27. The method of claim 20 wherein said new display coordinates are calculated according to a heuristic method.

28. The method of claim 20 wherein said moving step further comprises the steps of:
- interpolating a plurality of intermediate display coordinates between said initial display coordinates and said new display coordinates, and
- sequentially placing the labels at each of said intermediate display coordinates before placing said labels at said new display coordinates, thereby smoothing the movements of said labels on said display.

29. A method of positioning labels among graphical elements on a computer graphics display, comprising the steps of:
- sequentially selecting labels from a plurality of labels on the display;
- testing each of said selected labels for overlap with other labels and graphical elements in the display;
- accumulating an overlap score for each of said selected labels;
- generating a list of other labels and graphical elements that overlap each of said selected labels;

comparing a plurality of said lists and accumulating cluster lists of overlapping labels and graphical elements, each cluster list representing a respective cluster of overlapping labels;

sorting a plurality of said cluster lists according to the number of entries in each;

calculating initial display coordinates for the labels on a cluster by cluster basis;

calculating new display coordinates for the labels on a cluster by cluster basis;

comparing, on a cluster by cluster basis, the degree of overlap of labels and graphical elements with said new display coordinates with an existing degree of overlap of the labels and graphical elements with said initial display coordinates, and if the new coordinates result in a reduction of the degree of overlap, moving the graphical elements on the display from initial positions according to said initial display coordinates to new positions according to said new display coordinates.

30. The method of claim 29 wherein said overlap score is based on the degree of overlap between labels and graphical elements.

31. The method of claim 29 wherein labels are determined to be overlapping other labels or graphical elements when they are mutually overlapping.

32. The method of claim 29 wherein labels are determined to be overlapping other labels or graphical elements when they are transitively overlapping.

33. The method of claim 29 wherein said sorting is ordered from largest cluster list to smallest cluster list.

34. The method of claim 29 wherein said new display coordinates are calculated according to a stochastic method.

35. The method of claim 29 wherein said new display coordinates are calculated according to a heuristic method.

36. The method of claim 29 wherein said calculating of new display coordinates is ordered according to said cluster list.

37. The method of claim 29 wherein said moving step further comprises the steps of:

interpolating a plurality of intermediate display coordinates between the said initial display coordinates and said new display coordinates, and sequentially placing the labels at each of said intermediate display coordinates before placing said labels at said new display coordinates, thereby smoothing the movements of said labels on said display.

38. The method of claim 29, further comprising the step of repeating the foregoing sequence of steps through a plurality of iterations.

* * * * *

UNITED STATES PATENT AND TRADEMARK OFFICE
CERTIFICATE OF CORRECTION

| | | |
|---|---|---|
| PATENT NO. | : 7,131,060 B1 | |
| APPLICATION NO. | : 09/677467 | |
| DATED | : October 31, 2006 | |
| INVENTOR(S) | : Azuma | |

It is certified that error appears in the above-identified patent and that said Letters Patent is hereby corrected as shown below:

Column 1, lines 27-28 delete "label is attached" and replace with --label attached--.

Column 2, line 4 delete "becomes" and replace with --become--.

Column 2, line 50 delete "however, finish" and replace with --however, they finish--.

Column 3, line 66 delete "practice the" and replace with --practice, the--.

Column 7, line 33 delete "and it nose" and replace with --and its nose--.

Column 7, line 41 delete "ranges form" and replace with --ranges from--.

Column 7, lines 46-47 delete "such most" and replace with --such that most--.

Column 8, line 51 delete "variable" and replace with --variables--.

Column 10, line 12 delete "again checks" and replace with --check--.

Column 11, line 31 delete "then evaluated" and replace with --then be evaluated--.

Column 11, line 34 delete "then selects" and replace with --then select--.

Column 11, line 43 delete "in alternate" and replace with --in an alternate--.

Column 11, line 63 delete "This process if" and replace with --This process is--.

Column 12, line 5 delete "form their original position" and replace with --from their original positions--.

Column 12, line 46 delete "At step 88 the" and replace with --At step 88, the--.

Column 12, line 47 delete "if covers" and replace with --if it covers--.

Column 12, line 51 delete "At step 92 the" and replace with --At step 92, the--.

Column 12, lines 56-57 delete "At step 96 the" and replace with --At step 96, the--.

Column 12, line 59 delete "5.0 it is" and replace with --5.0 and it is--.

Column 12, line 62 delete "At step 100 the" and replace with --At step 100, the--.

UNITED STATES PATENT AND TRADEMARK OFFICE
CERTIFICATE OF CORRECTION

PATENT NO. : 7,131,060 B1
APPLICATION NO. : 09/677467
DATED : October 31, 2006
INVENTOR(S) : Azuma It is certified that error appears in the above-identified patent and that said Letters Patent is hereby corrected as shown below:

Column 12, line 66 delete "At step 104 the" and replace with --At step 104, the--.

Column 12, line 67 delete "if covers" and replace with --if it covers--.

Column 13, line 3 delete "At step 108" and replace with --At step 108,--.

Signed and Sealed this

Twelfth Day of June, 2007

JON W. DUDAS
*Director of the United States Patent and Trademark Office*